United States Patent
Hsu et al.

(10) Patent No.: US 7,285,584 B2
(45) Date of Patent: Oct. 23, 2007

(54) TIRE WITH COMPONENT COMPRISED OF RUBBER COMPOSITION CONTAINING HYDROPHOBATED, PRE-SILANIZED SILICA

(75) Inventors: Wen-Liang Hsu, Cuyahoga Falls, OH (US); Shingo Futamura, Wadsworth, OH (US); Kuo-Chih Hua, Richfield, OH (US); Kenneth Allen Bates, Brunswick, OH (US); Ping Zhang, Hudson, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 11/303,279

(22) Filed: Dec. 16, 2005

(65) Prior Publication Data

US 2007/0142518 A1   Jun. 21, 2007

(51) Int. Cl.
*C08K 9/06* (2006.01)
*C08K 3/36* (2006.01)

(52) U.S. Cl. .................. 523/213; 524/262; 524/263; 524/571; 152/450; 152/905

(58) Field of Classification Search .............. 523/213; 524/262, 263, 571; 152/450, 905
See application file for complete search history.

(56) References Cited

U.S. PATENT DOCUMENTS

| 4,436,847 | A | * | 3/1984 | Wagner | 523/203 |
| 4,474,908 | A | | 10/1984 | Wagner | 523/213 |
| 5,064,901 | A | | 11/1991 | Machado | 525/92 |
| 5,780,538 | A | | 7/1998 | Cohen et al. | 524/494 |
| 5,914,364 | A | * | 6/1999 | Cohen et al. | 524/494 |
| 6,448,318 | B1 | * | 9/2002 | Sandstrom | 524/284 |
| 6,573,324 | B1 | | 6/2003 | Cohen et al. | 524/492 |
| 2006/0183831 | A1 | * | 8/2006 | Hsu et al. | 524/262 |

* cited by examiner

*Primary Examiner*—Fred Teskin
(74) *Attorney, Agent, or Firm*—Henry C. Young, Jr.

(57) ABSTRACT

The invention relates to a tire having at least one component comprised of a rubber composition which contains a hydrophobated, pre-silanized silica, namely a pre-silanized silica hydrophobated with an epoxidized soybean oil and/or epoxidized rubber tree seed oil in situ within said rubber composition. Such tire component may be, for example although not limited to, a tire tread, sidewall and/or sidewall insert.

7 Claims, No Drawings

TIRE WITH COMPONENT COMPRISED OF RUBBER COMPOSITION CONTAINING HYDROPHOBATED, PRE-SILANIZED SILICA

FIELD OF THE INVENTION

The invention relates to a tire having at least one component comprised of a rubber composition which contains a hydrophobated, pre-silanized silica, namely a pre-silanized silica hydrophobated with an epoxidized soybean oil and/or epoxidized rubber tree seed oil in situ within said rubber composition. Such tire component may be, for example although not limited to, a tire tread, sidewall and/or sidewall insert.

Said pre-silanized silica is a precipitated silica having been silanized prior to adding to (blending with) said rubber composition by treatment of a precipitated silica with an alkoxysilane polysulfide.

BACKGROUND OF THE INVENTION

Tires may have a diene rubber-based component which contains precipitated silica as a reinforcing filler. The precipitated silica is typically used in combination with a coupling agent having a moiety reactive with hydroxyl groups (e.g. silanol groups) contained on the precipitated silica and another different moiety interactive with the diene rubber to thereby promote coupling between the precipitated silica and diene rubber.

However, where the coupling agent contains low molecular weight alkoxy groups for reacting with the hydroxyl groups of the precipitated silica (e.g. one or more ethoxy groups) within the rubber composition, low molecular weight alcohols result (e.g. ethanol) as a by-product which may be objectionable in some cases during the manufacture of rubber products.

Further, the synthetic precipitated silica is somewhat incompatible with diene rubbers. In such case it has been indicated that it can be beneficial to react the precipitated silica with a hydrophobating agent (which might sometimes be referred to as a wetting agent) to hydrophobate the precipitated silica to enhance its compatibility with a diene rubber. For example, it has been suggested to hydrophobate a precipitated silica in situ within the elastomer host by addition of both an organomercaptosilane and an alkyl silane (e.g. alkoxyorganosilane). For example, see U.S. Pat. No. 4,474,908.

For example, tires may have a rubber component in which both an alkoxyorganosilyl polysulfide and an alkylsilane (e.g. alkoxysilane) are individually added to a silica-containing rubber composition to treat the silica in-situ within the rubber host with both (A) the alkylsilane as a hydrophobating agent and (B) a silica coupler (an alkoxyorganosilyl polysulfide compound).

For example, see U.S. Pat. No. 5,780,538.

For example, tires have been suggested which may have a component which contains a pre-hydrophobated silica in which the silica is pre-hydrophobated prior to addition to the rubber composition. For example, see U.S. Pat. No. 6,573,324.

Historically, precipitated silica aggregates are typically hydrophilic (water attracting) in nature and, in order to aid in dispersing the silica aggregates in various rubber compositions, it is sometimes desired to make the silica aggregates more hydrophobic (water repelling) in nature and therefore more compatible with the rubber.

In the aforesaid U.S. Pat. Nos. 4,474,908 and 5,780,538, a hydrophobating agent may be added to a rubber composition to combine with the silica-in-situ within the rubber host to make the silica more hydrophobic in nature. In the said U.S. Pat. No. 6,573,324, a tire is provided with a component comprised of a rubber composition which contains particulate pre-hydrophobated precipitated silica aggregates where the silica aggregates are added to, or mixed with, the rubber composition in a pre-hydrophobated form.

Historically, one object of introducing precipitated silica to a rubber composition in a pre-hydrophobated form is to improve mixing of the precipitated silica with the rubber.

For this invention, it is desired herein to provide a silanized precipitated silica (pre-silanized in a sense of being silanized prior to addition to the rubber composition) which is hydrophobated in situ within a rubber composition with at least one of epoxidized soybean oil and epoxidized rubber tree seed oil, preferably an epoxidized soybean oil.

Accordingly, it is further proposed herein to provide a tire with a component of a rubber composition which contains a pre-silanized precipitated silica which is hydrophobated in situ within the rubber composition with an epoxidized soybean oil and/or epoxidized rubber tree seed oil.

In the description of this invention, the term "phr" relates to parts by weight for a material or ingredient per 100 parts by weight elastomer(s)". The terms "rubber" and "elastomer" are used interchangeably unless otherwise indicated. The terms "cure" and "vulcanize" are used interchangeably unless otherwise indicated.

SUMMARY AND PRACTICE OF THE INVENTION

In accordance with this invention, a rubber composition is provided which is comprised of, based on parts by weight per 100 parts by weight elastomer (phr):

(A) 100 phr of at least one conjugated diene-based elastomer, (B) about 10 to about 120, alternately about 40 to about 100, phr of reinforcing filler comprised of (1) particulate pre-silanized precipitated silica in situ hydrophobated (in situ hydrophobated within said rubber composition) with an epoxidized oil comprised of at least one of epoxidized soybean oil and epoxidized rubber tree seed oil, preferably epoxidized soybean oil, or (2) said pre-silanized, in-situ hydrophobated, precipitated silica and about 2 to about 100, alternately about 2 to about 50, phr of at least one additional reinforcing filler selected from at least one of carbon black and an additional precipitated silica (synthetic amorphous silica and different from said pre-silanized precipitated silica).

In practice, said pre-silanized precipitated silica (e.g. aggregates thereof) is a precipitated silica having been pre-silanized by treating precipitated silica having hydroxyl groups (e.g. silanol groups) on its surface (wherein said treatment is conducted prior to blending said silanized precipitated silica with said rubber composition) with an organomercaptoalkoxysilane or bis(3-trialkoxysilylalkyl) polysulfide having an average from 2 to about 3.8 connecting sulfur atoms in its polysulfidic bridge.

In practice said pre-silanization treatment of said precipitated silica may optionally additionally include treatment thereof with an alkylsilane, wherein said alkylsilane is of the general Formula (I)

$$X_n\text{—}Si\text{—}R_{4-n} \quad (I)$$

wherein R is an alkyl radical having from one to 18, preferably from one to 8, carbon atoms such as, for example, methyl, ethyl, isopropyl, n-butyl and octadecyl radicals, n is a value of from 1 to 3 and X is a radical selected from halogen, namely chlorine or bromine, preferably a chlorine radical, and alkoxy radicals, preferably an alkoxy radical as $(R^1O)\text{—}$, wherein $R^1$ is an alkyl radical having from one to 3 carbon atoms such as, for example, methyl, ethyl and isopropyl radicals, preferably from methyl and ethyl radicals.

In practice said organomercaptoalkoxysilane for said pre-silanization treatment of said precipitated silica may be of the general formula (II):

$$(X)_n(R^2O)_{3-n}\text{—}Si\text{—}R^3\text{—}SH \quad (II)$$

wherein X is a radical selected from halogen, namely chlorine or bromine, preferably a chlorine radical, and alkyl radicals having from one to 16, preferably from one to 4, carbon atoms, preferably selected from methyl, ethyl, n-propyl and n-butyl radicals; wherein $R^2$ is an alkyl radical having from one to 16, preferably from one to 4 carbon atoms, preferably selected from methyl and ethyl radicals and $R^3$ is an alkylene radical having from one to 16, preferably from one to 4, carbon atoms, preferably a propylene radical; n is a value from zero to 3, preferably zero.

Representative of said bis(3-trialkoxysilylalkyl) polysulfides are, for example, bis(3-triethoxysilylpropyl) polysulfide. Said bis(3-trialkoxysilylalkyl) polysulfides may, for example, have an average of from about 2.2 to about 2.6, or an average of from about 3.2 to about 3.8, connecting sulfur atoms in its polysulfidic bridge.

In further accordance with this invention, a tire is provided having at least one component of a comprised of said rubber composition. Representative of such tire components, and not intended to be limitive, are for example a tire tread and a tire sidewall.

In further accordance with this invention, a process of preparing a rubber composition is provided which comprises blending, based upon parts by weight per 100 parts by weight rubber (phr):

(A) 100 phr of at least one conjugated diene-based elastomer, (B) about 10 to about 120, alternately about 40 to about 100, phr of reinforcing filler comprised of
  (1) particulate, pre-silanized precipitated silica,
  (2) an epoxidized oil comprised of at least one of epoxidized soybean oil and epoxidized rubber tree seed oil, preferably epoxidized soybean oil, and
  (3) from zero to about 100, alternately from about 2 to about 100, alternately about 2 to about 50, phr of at least one additional reinforcing filler selected from at least one of rubber reinforcing carbon black and an additional precipitated silica (synthetic amorphous silica);

wherein said pre-silanized precipitated silica (aggregates) is a precipitated silica having been pre-silanized by treating precipitated silica with said organomercaptoalkoxysilane or bis(3-trialkoxysilylalkyl) polysulfide having an average of from 2 to about 3.8 connecting sulfur atoms in its polysulfidic bridge.

In additional accordance with this invention a rubber composition prepared by said process is provided.

In further accordance with this invention a tire is provided having at least one component comprised of a rubber composition prepared by said process.

Representative alkylsilanes of Formula (I) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptoalkoxysilanes of Formula (II) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane. A representative example of silanized silica using said bis(3-trialkoxysilylalkyl) polysulfide is Coupsil™ from Degussa. A representative example of silanized silica using 3-mercaptopropyltriethoxysilane is Ciptane LP™ from PPG Industries.

Representative examples of said bis(3-trialkoxysilylalkyl) polysulfides are, for example, comprised of bis (3-triethoxysilylpropyl) polysulfides having an average connecting sulfur atoms in its polysulfidic bridge in a range of from about 2 to about 3.8, alternatively in a range of from about 2.2 to about 2.6 or in a range of from about 3.2 to about 3.8. Representative examples of such bis(3-triethoxysilylpropyl) polysulfides are, for example Si69™ from Degussa understood to have an average connecting sulfur atoms in its polysulfidic bridge in a range of about 3.2 to about 3.8 and a bis(3-triethoxysilylpropyl) as Si266™ from Degussa understood to have an average connecting sulfur atoms in its polysulfidic bridge in a range of about 2.2 to about 2.6.

A representative example of epoxidized soybean oil is Plasthall ESO™ from CP Hall. Epoxidized rubber tree seed oil is referenced in "Use of Epoxidized Rubber Seed Oil as a Coupling Agent and a Plasticizer in Silica-Filled Natural Rubber Compounds", by R. Joseph, et al, Rubber Research Institute of India, Received 18 Dec. 2003, accepted 9 Jan. 2004.

While the mechanism may not be completely understood, it appears that the epoxidized soybean oil and epoxidized rubber tree seed oil act to hydrophobate the pre-silanized precipitated silica surface by hydrogen bonding with hydroxyl groups (e.g. silanol groups) on the silica surface of the pre-silanized silica.

Accordingly, in one aspect, it is desired that the epoxidized soybean oil and/or epoxidized rubber tree oil is added to the rubber composition to effect a hydrophobation of the pre-silanized precipitated silica in the absence of adding (exclusive of) an alkylsilane, particularly an alkoxysilane, to the rubber composition for such purpose.

In further accordance with this invention, the tire of this invention is provided wherein said component which may be, for example, a tire tread such as for example a tread, tread cap and/or tread base; tire sidewall; tire carcass component such as for example a carcass cord ply coat; tire sidewall stiffening insert; an apex adjacent to or spaced apart from a tire bead; tire chafer; and tire bead component.

In the practice of this invention, the various components of the tire may be a rubber composition comprised of various conjugated diene based elastomers. Such diene-based elastomers may be polymers and copolymers of conjugated dienes, such as, for example, isoprene and 1,3-butadiene, and copolymers of at least one conjugated diene hydrocarbon and vinyl aromatic compound selected from styrene and alphamethyl styrene, preferably styrene.

For example, representative of such elastomers are cis 1,4-polyisoprene rubber (natural and synthetic), cis 1,4-polybutadiene rubber, high vinyl polybutadiene rubber having a vinyl 1,2 content in a range of about 10 percent to about 90 percent, styrene/butadiene copolymer (SBR) rubber (aqueous emulsion or organic solution polymerization prepared copolymers) and including organic solvent polymerization prepared SBR having a vinyl 1,2-content in a range of about 10 to about 90 percent based on its polybutadiene derived portion and a polystyrene content in a range of about 10 to about 60 percent based upon the copolymer, styrene/isoprene/butadiene terpolymer rubber, butadiene/acrylonitrile rubber, styrene/isoprene copolymer and isoprene/butadiene copolymer rubber, 3,4-polyisoprene rubber and trans 1,4-polybutadiene rubber.

Organic solvent polymerization prepared tin coupled elastomers such as for example, tin coupled styrene/butadiene copolymers may also be used.

Tin coupled copolymers of styrene/butadiene may be prepared, for example, by introducing a tin coupling agent during the styrene/1,3-butadiene monomer copolymerization reaction in an organic solvent solution, usually at or near the end of the polymerization reaction. Such coupling of styrene/butadiene copolymers is well known to those having skill in such art.

In practice, it is usually preferred that at least 50 percent and more generally in a range of about 60 to about 85 percent of the Sn (tin) bonds in the tin coupled elastomers are bonded to butadiene units of the styrene/butadiene copolymer to create Sn-dienyl bonds such as butadienyl bonds.

Creation of tin-dienyl bonds can be accomplished in a number of ways such as, for example, sequential addition of butadiene to the copolymerization system or use of modifiers to alter the styrene and/or butadiene reactivity ratios for the copolymerization. It is believed that such techniques, whether used with a batch or a continuous copolymerization system, is well know to those having skill in such art.

Various tin compounds, particularly organo tin compounds, may be used for the coupling of the elastomer. Representatives of such compounds are, for example, alkyl tin trichloride, dialkyl tin dichloride, yielding variants of a tin coupled styrene/butadiene copolymer elastomer, although a trialkyl tin monochloride might be used which would yield simply a tin-terminated copolymer.

Examples of tin-modified, or coupled, styrene/butadiene copolymer elastomers might be found, for example, in U.S. Pat. No. 5,064,901.

Various commercially available silicas, namely precipitated silicas, may also be added to the rubber composition together with the said treated silica for the reinforcement of the diene based elastomers. Representative of such silicas, for example, only and without limitation, are silicas from PPG Industries under the Hi-Sil trademark with designations 210, 243, etc; silicas from Rhodia, with designations of Zeosil 1165MP and Zeosil 165GR, silicas from Degussa AG with designations VN2 and VN3, and silicas from Huber as Zeopol 8745 and Zeopol 8715.

It is readily understood by those having skill in the art that the rubber composition of the tread rubber would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

The presence and relative amounts of the above additives are not considered to be an aspect of the present invention, unless otherwise indicated, which is more primarily directed to a tire with a component of a rubber composition which contains the described particulate, pre-hydrophobated precipitated silica aggregates.

The tires can be built, shaped, molded and cured by various methods which will be readily apparent to those having skill in such art.

EXAMPLE I

Experiments were undertaken to evaluate the feasibility of further hydrophobating a pre-silanized precipitated silica in situ within a rubber composition with epoxidized soybean oil.

Comparative rubber compositions were prepared which contained pre-silanized precipitated silica reinforcement identified herein as Control Sample A and Control Sample B.

An experimental rubber composition was prepared which contained a silanized precipitated silica reinforcement and, in addition, an epoxidized soybean oil (as a silica hydrophobating agent for hydrophobating the pre-silanized precipitated silica in situ within the rubber composition) and identified herein as Sample C.

The rubber composition samples were prepared by mixing the elastomers together with reinforcing fillers and other rubber compounding ingredients in a first non-productive mixing stage (NP-1) in an internal rubber mixer for about 5 minutes to a temperature of about 170° C. The mixture (optionally) may then be further sequentially mixed in a second non-productive mixing stage (NP-2) in an internal rubber mixer for about 3 minutes to a temperature of about 170° C. The resulting mixture is then mixed in a productive mixing stage (PR) in an internal rubber mixer with curatives for about 2 minutes to a temperature of about 108° C. The rubber composition is cooled to below 40° C. between each of the non-productive mixing steps and between the second non-productive mixing step and the productive mixing step.

Table 1 illustrates the basic formulations for Control Sample A, Control Sample B and Experimental Sample C and Table 2 reports various physical properties of the prepared rubber samples.

The parts and percentages are by weight unless otherwise indicated.

TABLE 1

| Samples | Control A | Control B | C |
|---|---|---|---|
| Non-Productive Mix Step (NP-1), (170° C.) | | | |
| Styrene/butadiene copolymer rubber[1] | 60 | 60 | 60 |
| Cis 1,4-polybutadiene rubber[2] | 40 | 40 | 40 |
| Precipitated silica[3] | 60 | 0 | 0 |
| Silica coupling agent[4] | 4.8 | 0 | 0 |
| Silanized silica[5] | 0 | 64.8 | 64.8 |
| Epoxidized soybean oil ("ESO")[6] | 0 | 0 | 4 |
| Carbon black[7] | 20 | 20 | 20 |
| Rubber processing oil[8] | 33.75 | 33.75 | 33.75 |
| Wax[9] | 0.8 | 0.8 | 0.8 |
| Fatty acid[10] | 2 | 2 | 2 |
| Productive Mix Step (PR), (108° C.) | | | |
| Sulfur | 1.9 | 1.9 | 1.9 |
| Accelerators[12] | 2.1 | 2.1 | 2.1 |

[1]Solution polymerization prepared styrene/butadiene rubber as SLF28x42 ™ from The Goodyear Tire & Rubber Company
[2]Polybutadiene rubber as BUD1254 ™ from The Goodyear Tire & Rubber Company
[3]Precipitated silica as Zeosil 1165MP ™ from Rhodia
[4]Silica coupler as a liquid bis(3-triethoxysilylpropyl)polysulfide having an average connecting sulfur atoms in its polysulfidic bridge in a range of from about 2.2 to about 2.6 as Si266 ™ from Degussa
[5]Silanized precipitated silica as Ciptane LP ™ from PPG Industries as a precipitated silica silanized by treatment with 3-mercaptopropyltriethoxysilane
[7]Epoxidized soybean oil as Plasthall ESO ™ from CP Hall
[8]N205 rubber reinforcing carbon black, and ASTM designation
[9]Rubber processing oil as Valaro 130A ™ from the Valero Energy Corporation
[10]Microcrystalline (or paraffinic) wax
[11]Comprised of stearic, palmitic and oleic acids, primarily stearic acid
[12]Sulfur rubber vulcanization accelerator of the sulfenamide type The following Table 2 illustrates cure behavior and various physical properties of the rubber compositions of Samples A through C. Where cured rubber samples are examined, such as for the stress-strain, rebound, hardness, tear strength and abrasion measurements, the rubber samples were cured for about 14 minutes at a temperature of about 160° C.

TABLE 2

| | Control A | Control B | C |
|---|---|---|---|
| Rubber Compound (Cpd) Samples | | | |
| Precipitated silica | 60 | 0 | 0 |
| Silanized silica | 0 | 64.8 | 64.8 |
| Epoxidized soybean oil | 0 | 0 | 4 |
| Silica coupling agent | 4.8 | 0 | 0 |
| Stress-strain (ATS)[1] | | | |
| Tensile strength (MPa) | 15.8 | 15.4 | 16.3 |
| Elongation at break (%) | 502 | 532 | 572 |
| 300% modulus, ring (MPa) | 8.15 | 6.73 | 6.43 |
| Rebound, ATS | | | |
| 23° C. | 33.4 | 36.1 | 35.4 |
| 100° C. | 55.2 | 54.3 | 56.4 |
| Mooney (ML1 + 4) viscosity (unvulcanized rubber composition) | | | |
| 100° C. | 63 | 68 | 55 |
| RPA, 100° C., 1 Hertz[2] | | | |
| Storage modulus G', uncured (MPa) | 0.124 | 0.131 | 0.108 |
| Storage modulus G', 1% strain (MPa) | 2.547 | 1.748 | 1.558 |
| Storage modulus G', 50% strain (MPa) | 0.977 | 0.776 | 0.747 |
| Tan Delta at 10% strain | 0.116 | 0.121 | 0.114 |
| Payne Effect, G'(1% strain)/G' (50% strain)[3] | 2.61 | 2.25 | 2.09 |

[1]Data obtained according to Automated Testing System instrument by the Instron Corporation which incorporates a number of tests in one system. Such instrument may determine, for example, ultimate tensile, ultimate elongation and ring modulus. Data reported in the Table is generated by running the ring tensile test station which is an Instron 4201 load frame.
[2]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H. A. Palowski, et al, Rubber World, June 1992 and January 1997, as well as Rubber & Plastics News, April 26 and May 10, 1993
[3]Payne Effect as a ratio of storage modulus G' at 1 percent strain divided by storage modulus G' at 50 percent strain. A reduction in the Payne Effect value is indicative of greater polymer-filler interaction and lesser filler-filler interaction which is indicative of reduced hysteresis.

From Table 2 it is seen that a large drop in uncured rubber composition Mooney viscosity (100° C.) to a value of 55 is observed for Sample C with the epoxidized soybean oil in situ hydrophobation of the silanized silica as compared to a significantly higher value of 68 for Sample B with the silanized silica but without the inclusion of the epoxidized soybean oil and as compared to a significantly higher value of 63 for Sample A without the silanized silica.

This is considered herein as being significant because the processability of the unvulcanized rubber composition by use of the silanized silica in combination with the inclusion of the epoxidized soybean oil for a rubber product manufacturing operation in an internal rubber mixer is greatly improved by the large reduction in the Mooney viscosity.

It is further seen from Table 2 that, for the uncured rubber compositions, a significantly lower uncured storage modulus (G') of 0.108 MPa for Sample C was observed as compared to a significantly higher value of 0.131 MPa for Sample B and a value of 0.124 MPa for Sample A.

This is considered herein as being significant because it is indicative of improved processability of the rubber composition by use of the silanized silica in combination with the inclusion of the epoxidized soybean oil for a rubber product manufacturing operation in an internal rubber mixer as compared to Sample B and to Sample A.

From Table 2 it is also seen that, for the cured rubber compositions, a higher Rebound value (100° C.) of 56.4 for Sample C is observed as compared to a value of 54.3 for Sample B and a value of 55.2 for Sample A.

This is considered herein as being significant because it is indicative of lower hysteresis for Sample C and therefore predictive of reduced internal heat generation within the rubber composition during use and better fuel economy for an associated vehicle due to a predictive reduction in rolling resistance for the tire, as compared to the rubber compositions of Sample B and Sample A.

Similarly, from Table 2 it is also seen that, for the cured rubber compositions, a lower tan delta (10 percent strain) of 0.114 for Sample C is observed as compared to a value of 0.121 for Sample B and a value of 0.116 for Sample A.

This is considered herein as being significant because it is also indicative of a lower hysteresis for Sample C, as was indicated by previously indicated higher rebound value and therefore predictive of reduced internal heat generation within the rubber composition during use and better fuel economy for an associated vehicle due to a predictive reduction in rolling resistance for the tire, as compared to the rubber compositions of Sample B and Sample A.

It is also seen, for the cured rubber compositions, that a lower storage modulus (G'), at a low strain of 1 percent, of 1.558 MPa for Sample C is observed as compared to a value of 1.748 MPa for Sample B and a value of 2.547 MPa for Sample A.

This is considered herein to be significant because it is indicative of less filler-filler networking for Sample C and therefore predictive of reduced internal heat generation within the rubber composition during use and better fuel economy for an associated vehicle due to a predictive reduction in rolling resistance for the tire, as compared to the rubber compositions of Sample B and Sample A and therefore confirms the aforesaid tan delta observation.

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of, based on parts by weight per 100 parts by weight elastomer (phr):
   (A) 100 phr of at least one conjugated diene-based elastomer,
   (B) about 10 to about 120 phr of reinforcing filler comprised of
     (1) particulate pre-silanized precipitated silica in situ hydrophobated (within said rubber composition) with an epoxidized oil comprised of epoxidized rubber tree seed oil or
     (2) said pre-silanized, in-situ hydrophobated, precipitated silica and about 2 to about 100 phr of at least one additional reinforcing filler selected from at least one of carbon black and an additional precipitated silica,
   wherein said pre-silanized precipitated silica is a precipitated silica having been pre-silanized by treating precipitated silica having hydroxyl groups on its surface with an organomercaptoalkoxysilane or bis(3-trialkoxysilylalkyl) polysulfide having an average from 2 to about 3.8 connecting sulfur atoms in its polysulfidic bridge.

2. The tire of claim 1 wherein said organomercaptoalkoxysilane is of the general formula $$(X)_n(R^2O)_{3-n}\text{—Si—}R^3\text{—SH} \qquad (II)$$

wherein X is a radical selected from chlorine, bromine and alkyl radicals having from one to 16 carbon atoms; wherein $R^2$ is an alkyl radical having from one to 16 carbon atoms; $R^3$ is an alkylene radical having from one to 16 carbon atoms and n is zero.

3. The tire of claim 1 wherein said bis(3-trialkoxysilylalkyl) polysulfide has an average of from about 2.2 to about 2.6, or an average of from about 3.2 to about 3.8, connecting sulfur atoms in its polysulfidic bridge.

4. The tire of claim 1 wherein said bis(3-trialkoxysilylalkyl) polysulfide is comprised of bis(3-triethoxysilyipropyl) polysulfide having an average of from about 2.2 to about 2.6 connecting sulfur atoms in its polysulfidic bridge.

5. The tire of claim 1 wherein said organomercaptoalkoxysilanes are comprised of at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

6. The tire of claim 1 wherein said bis(3-trialkoxysilylalkyl) polysulfide is comprised of bis (3-triethoxysilylpropyl) polysulfides having an average connecting sulfur atoms in its polysulfidic bridge in a range of from about 3.2 to about 3.8.

7. The tire of claim 1 wherein said reinforcing filler is comprised of about 10 to about 120 phr of reinforcing filler comprised of said pre-silanized, in-situ hydrophobated, precipitated silica and about 2 to about 100 phr of at least one additional reinforcing filler selected from at least one of carbon black and an additional precipitated silica.

* * * * *